Dec. 20, 1949     H. L. BEEKLEY     2,492,030
SEALING MEANS FOR VALVES
Filed April 27, 1945

Inventor:
Henry L. Beekley,
By Clinton, Wilkey Schroeder
Merriam & Hopgren, Attys.

Patented Dec. 20, 1949

2,492,030

UNITED STATES PATENT OFFICE 2,492,030

SEALING MEANS FOR VALVES

Henry L. Beekley, Glen Ellyn, Ill., assignor, by mesne assignments, to Electrimatic Company, a corporation of Illinois Application April 27, 1945, Serial No. 590,613

3 Claims. (Cl. 286—29)

This invention relates to sealing means for valves and more particularly to sealing means applied to an actuating rod having a limited amount of longitudinal movement.

Sealing means for longitudinally movable rods as heretofore used in valves have generally consisted of metallic Sylphon tubes, but such tubes have a limited life because the many longitudinal movements set up therein cause the same to wear out relatively rapidly through metal fatigue. In the present invention I have overcome this difficulty by providing a sealing means comprising a rubber boot having a novel mounting upon the longitudinally movable push pin or actuating rod, a novel arrangement that very greatly increases the life of such sealing means.

One feature of this novel mounting is the use of a helical spring within the rubber boot, between it and the actuating rod it surrounds, so constructed and arranged as to provide a movable support for the resilient walls of the boot, a support which not only prevents the walls from collapsing on the actuating rod (by virtue of fluid pressure surrounding the boot) when the parts are standing still, but which also moves with the walls of the boot as they stretch and elongate in use, so that there is no mechanical abrasion between the rubber and any inner part. Another feature of this novel mounting is the manner in which one end of the boot is sealed to the actuating rod in a fluid-tight and mechanically-tight manner, without the necessity of high temperatures for bonding rubber to metal, threaded parts which might loosen up in use, or the like.

Among the objects of the present invention are to obviate the disadvantages and accomplish the advantages referred to above; a further object being to provide a sealing means embodying a stretchable resilient rubber boot so mounted upon the longitudinally movable push pin as positively to seal the push pin against leakage and greatly increase the life and efficiency of the sealing means; further to provide spring means for balancing the fluid pressure and to hold the boot out against pressure even when the rubber of the boot becomes old and after it has been flexed many times; and such further objects, advantages and capabilities as will later more fully appear.

My invention further resides in the combination, construction and arrangement of parts illustrated in the accompanying drawing, and while I have shown therein a preferred embodiment I wish it understood that the same is susceptible of modification and change without departing from the spirit of my invention.

Figure 1:
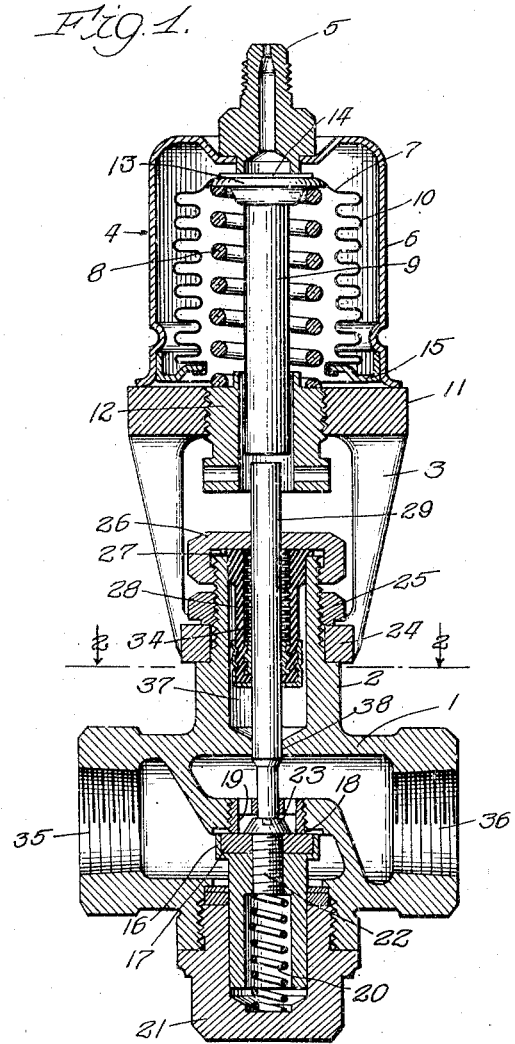
Fig. 1 is a vertical longitudinal section through a valve arrangement embodying my invention.

Referring more in detail to the drawing, my invention is applied to a valve having a body portion 1, an upstanding tubular neck 2 to which is secured the yoke 3 upon which are mounted the actuating portion of a control device 4 which is here shown as a conventional arrangement intended to be operated by fluid pressure such as for example fluid from a control thermostat. The control fluid is admitted through the pipe member 5, to the housing 6, where its pressure is exerted on the top of the member 7 in opposition to a spring 8, so that the position of the member 7 and of the push rod 9 fastened to it are a function of the pressure of the control fluid. A sealing arrangement is thus provided, in conventional manner, by a Sylphon or sealing bellows 10. Secured to the head 11 of the yoke 3 by screw threads is a member 12 having a control opening slidably receiving the push rod 9. The upper end of the Sylphon bellows is closed and provided with a pocket receiving the head member 13 on the top of rod 9, this being maintained up in the pocket by spring 8, a reinforcing plate 14 being spot welded to the top surface of the top portion of the bellows to protect it from wear or damage. The bottom end of the bellows 10 is fixed in sealing engagement with the bottom member 15 by being crimped over its inner annular edge. As will be understood, this construction seals the control fluid on the outside of the bellows and inside of the housing 6, and under fluctuations in pressure of this control fluid, and through action of spring 8, the rod 9 is caused to have longitudinal movement.

The valve member 16 is provided with suitable packing 17 which is held against the bead 18 for the orifice 19 by means of a spring 20 bearing against the bottom of the hollow nut 21 threadedly mounted in the bottom of the valve body member 1. The packing member 17 is held against the face of the valve member 16 by a screw bolt 22 having at its upper end a head 23 bearing against the packing member. The yoke arms 3 of the control arrangement 4 are fixed at their lower ends to the annular ring 24 mounted upon a shoulder on the neck 2, which ring is clamped against this shoulder by a lock nut 25 threaded onto the upwardly extending tubular end of the neck. Threadedly mounted on this upper end of the neck 2 is a sealing nut 26 which has clamped between its under surface and the upper edge of the threaded upper end of neck 2, the radially extending annular flange 27 of the rubber boot 28.

Figure 3:
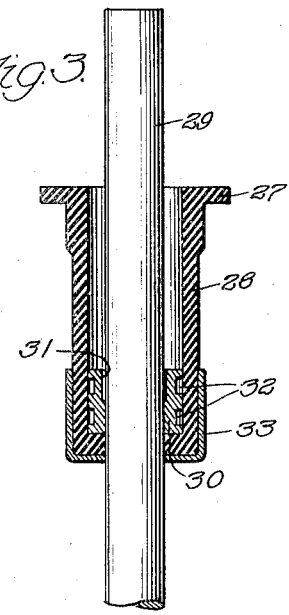
Fig. 3 is an enlarged vertical section through a rubber boot embodying my invention, and showing the means for connecting the boot to the push pin in the assembled position but prior to being finally fastened together.
Figure 4:
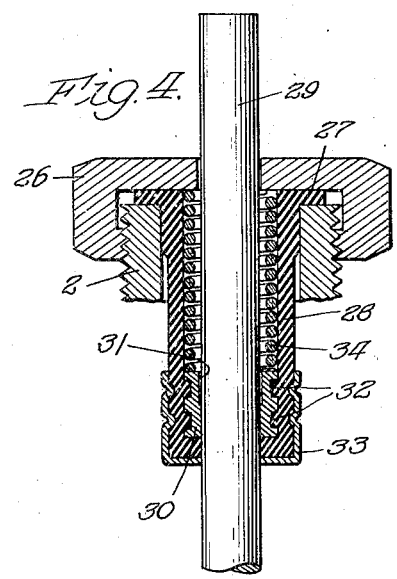
Fig. 4 is an enlarged partial vertical section after the boot and connecting parts have been fastened together, corresponding to a portion of Figure 1.
Figure 2:
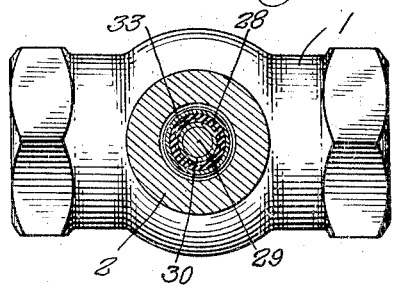
Fig. 2 is a transverse section on the line 2—2 of Fig. 1.

This rubber boot has an interior diameter somewhat greater than that of the push pin 29 so as to receive in the bottom end of the boot, between the push pin and the inner side walls of the boot, a boot adapter 30 which is fixed to the push pin 29 by solder or the like 31, and so as to receive a spring for purposes hereinafter more fully described. Silver solder is very good for soldering the boot adapter to the push pin but I wish it understood that any other suitable securing means can be used as desired. As shown in Figs. 1, 3, and 4, the boot adapter 30 is provided with two circumferential grooves 32, but any other number than two may be used as desired. The boot adapter 30 is preferably of nickel-copper construction, but any other suitable metal may be used as desired. As will be understood in Figs. 3 and 4 the boot adapter 30 is of an exterior diameter to be normally seatable in the bottom end of the boot and of an interior diameter to be slidable over the push pin 29 prior to being fixed thereto by the soldered connection 31.

Positioned over the outside of the lower end of the boot is a boot cup or ferrule 33 of a size to be slipped over the bottom end of the boot and having its bottom in contact with the bottom of the boot, and an opening to enable this cup to be slid over the valve stem when assembling the parts. As noted in Figs. 3 and 4 the upper end of the cup 33 is approximately in line with the upper end of the adapter 30. When the cup 33 has been slipped over the bottom end of the boot as pointed out above, it will have its side walls directly opposite each of the grooves 32 pressed inwardly by any suitable pressing or spinning machine so as to force the rubber of the boot tightly into the grooves 32 as shown in Fig. 4. This firmly and nonleakably attaches the boot to the push pin 29. As stated earlier the flange 27 at the upper end of the boot is clamped between the threaded upper end of the neck 2 and the sealing nut 26 to form a nonleakable connection therebetween.

From the above the method of assembling the boot fixedly on the push pin will be understood. In this assembling operation the boot adapter 30 is preferably first fixed in proper position upon the push pin by the solder 31 or other suitable securing means so as to fix this adapter against longitudinal movement on the push pin and nonleakable with relation thereto. Next the rubber boot 28 is pulled over the adapter and brought to the position shown in Fig. 3, after which the boot cup 33 is slipped over the bottom end of the boot to the position shown in Fig. 3, and the wall members of the cup pressed inwardly opposite the grooves 32 so as to force the rubber of the boot into these grooves and the cup wall into the rubber of the boot so as to fixedly and nonleakably secure these parts together as shown in Fig. 4. The boot will preferably be made of rubber, rubber composition, or other suitable resilient material adapted to the purposes set forth herein.

After the boot has been thus assembled onto the push rod 29 the spring 34 is slipped in place, between the boot and the rod, before this assembly is placed in the cavity 37 and the cap nut 26 tightened down on the top flange 27 of the boot. The spring 34 encircles the push rod 29, lying between it and the cylindrical inner surface of the side walls of the boot. When the valve is in the closed position shown in Fig. 1, the spring should be nearly but not quite bottomed, with the turns of the helical spring very closely adjacent each other in this terminal or limit of the normal range of movement of the parts. The spring must not be bottomed, of course, with the turns touching, since the limiting factor on movement of the valve and push rod in the upward direction must be the engagement of the gasket 17 with the seat bead 18. On the other hand, it is desirable to have the turns as close together as possible without touching in order to prevent any wide spacing between turns at the other limit of range of movement between the parts when the push rod is moved down to move the valve member to open position. The size of the spring and the closeness with which it is wound should be such that at the other terminal of this movement (the point of maximum elongation of the spring) the space between turns should be less than the thickness of the thinner portion of the resilient walls of the rubber boot. Too wide spacing between the turns defeats the purpose of the spring in that it permits the walls of the boot to yield or bend in to too great an extent, resulting in pinching and abrasion of the boot walls when the valve again closes. By use of a spring of the kind which I prefer, the resilient walls of the boot are not only supported and prevented from collapsing in against the actuating rod by reason of the substantial external pressure in the chamber 37 (which might be 150 pounds per square inch in a refrigeration unit, for example), but are also supported in such a way that the metal support moves with the portion of the wall it contacts during elongation of the boot. That is, any elongation of the boot incident to downward movement of the actuating rod 29 to open the valve is accomplished by an equal and equally distributed movement of the turns of the spring, so that each spring turn remains in engagement with the same portion of the inner surface of the boot wall. This similar elongation would be interfered with if the spring tightly encircled the push rod, and it is for that reason I prefer to have clearance between the inner diameter of the spring and the outer diameter of the rod 29, as may be best seen in Figure 4.

As will be understood in Fig. 1 the valve member 16 will be normally held by spring 20 against its seat, thus preventing the passage of fluid therethrough, until such time as the valve is opened. When the push rod 9 is moved downwardly under a pressure increase in the control fluid within the housing the lower end of rod 9 will cause the push pin 29 to move downwardly and open valve 16. During this downward movement the boot 28 will be stretched longitudinally and elongated accordingly, the turns of the spring moving with the adjacent wall portions of the boot.

This opening of the valve will permit the passage of fluid through the inlet 35 past the open valve, through the orifice 19 and out the outlet 36. When the conditions within the control housing have changed such as to cause the control fluid to have a sufficiently lower pressure, the push rod 9 and push pin 29 will move upwardly to permit closing of the valve 16 under action of spring 20. This return action permits the boot 28 to decrease its length and return to its normal position, the turns of the spring again moving with the adjacent wall portions of the boot. As will be understood, the spring 34 balances the fluid pressure in the space 37 that may have passed through the opening 38 from the outlet side of the valve, preventing collapsing of the walls of the boot onto the push rod, and is very important in retaining proper action of the valve, particularly when the rubber has aged.

When this valve is used for marine work the boot adapter and boot cup may be made of Monel metal to prevent corrosions due to sea water and the like, and when used for other standard purposes these parts may be made of brass or any other suitable and desirable metal.

The normal longitudinal movement of the boot in half inch valves is about ⅛ of an inch maximum, and usually runs from $\frac{1}{16}$ to $\frac{3}{64}$ of an inch. Applicant, however, has tested this type of boot up to $\frac{1}{16}$ inch longitudinal movement, with very satisfactory life and action. The boot of the present invention is economical as it costs much less than the Sylphon type seal. With the use of the spring 34 the boot will always be properly supported against pressure in the space 37 even when the rubber is old and after it has been flexed many times.

From the above it will be seen that applicant has provided an improved sealing means for valves which will successfully stand many more cycles of operation than possible in sealing means heretofore known, reduce the cost of such sealing means, eliminate troublesome disassembly for removal of parts and avoid leakage due to breakage of the sealing means.

Having described my invention, I claim:

1. Sealing means for valves operated by a longitudinally movable rod element, comprising: a hollow rubber boot; a boot adapter in the bottom portion of the hollow of the boot and fixed nonleakably to the rod element to move therewith, said boot adapter having a bore a portion of which is substantially equal in diameter to the diameter of the rod element, and a portion of which is greater in diameter than the diameter of the rod element, and said adapter having an annular groove in its outer surface; and a boot cup outside of the lower portion of the boot, said cup having an inwardly extending annular bead tightly pressing the adjacent portion of the boot into said groove.

2. Sealing means for valves operated by a longitudinally movable rod element passing through a space to be sealed against leakage to the outside of pressure on the inside of the space, comprising: a hollow resilient boot having an outwardly projecting annular flange at one end and an inwardly projecting right angular annular flange at the other end; means for clamping said outwardly projecting flange non-leakably at one portion of said space; a separate boot adapter seated upon said inwardly projecting flange in the hollow of said boot and fixed non-leakably to the rod element; means for tightly and non-leakably gripping the boot to the adapter; and a helical spring encircling said rod element within said boot and providing movable support for the walls thereof, the spring normally being out of contact with the rod element and the turns of said spring almost touching each other in one of the terminal positions of the normal range of movement of said rod element and not being separated more than the thickness of the resilient walls supported thereby in the other terminal position.

3. Sealing means for valves operated by a longitudinally movable rod element passing through a space to be sealed against leakage to the outside of pressure on the inside of the space, comprising: a hollow rubber boot having a flange at one end; means for clamping said flange non-leakably at one portion of said space; a boot adapter in the hollow of the boot and fixed non-leakably to the rod element, said boot adapter having a bore a portion of which is greater in diameter than the diameter of said rod element; and means for tightly and non-leakably gripping the boot to the adapter, said adapter having an annular groove in its outer surface, and said last mentioned means including an outside member having an inwardly extending annular projection tightly pressing the adjacent portion of the boot into the groove.

HENRY L. BEEKLEY.

REFERENCES CITED

The following references are of record in the file of this patent:

UNITED STATES PATENTS

| Number | Name | Date |
|---|---|---|
| 429,611 | Facer | June 10, 1890 |
| 601,591 | Sherman | Mar. 29, 1898 |
| 884,694 | Weant | Apr. 14, 1908 |
| 2,178,490 | Nielsen | Oct. 31, 1939 |
| 2,211,446 | Troshkin | Aug. 13, 1940 |
| 2,245,648 | Campbell | June 17, 1941 |

FOREIGN PATENTS

| Number | Country | Date |
|---|---|---|
| 457,166 | Germany | of 1927 |
| 6,371 | Great Britain | of 1894 |